United States Patent
Ananthakrishnan et al.

(10) Patent No.: US 10,067,553 B2
(45) Date of Patent: *Sep. 4, 2018

(54) DYNAMICALLY CONTROLLING CACHE SIZE TO MAXIMIZE ENERGY EFFICIENCY

(71) Applicant: Intel Corporation, Santa Clara, CA (US)

(72) Inventors: Avinash N. Ananthakrishnan, Hillsboro, OR (US); Efraim Rotem, Haifa (IL); Eliezer Weissmann, Haifa (IL); Doron Rajwan, Rishon Le-Zion (IL); Nadav Shulman, Tel Mond (IL); Alon Naveh, Ramat Hasharon (IL); Hisham Abu-Salah, Majdal Shams (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,208

(22) Filed: Sep. 20, 2016

(65) Prior Publication Data
US 2017/0010656 A1    Jan. 12, 2017

Related U.S. Application Data

(63) Continuation of application No. 14/840,639, filed on Aug. 31, 2015, now Pat. No. 9,471,490, which is a (Continued)

(51) Int. Cl.
*G06F 12/08* (2016.01)
*G06F 1/32* (2006.01)
(Continued)

(52) U.S. Cl.
CPC .............. *G06F 1/3275* (2013.01); *G06F 1/28* (2013.01); *G06F 1/3287* (2013.01);
(Continued)

(58) Field of Classification Search
None
See application file for complete search history.

(56) References Cited

U.S. PATENT DOCUMENTS 5,163,153 A    11/1992  Cole et al.
5,287,292 A    2/1994   Kenny et al.
(Continued)

FOREIGN PATENT DOCUMENTS

CN    101351759    1/2009
CN    101403944    4/2009
(Continued)

OTHER PUBLICATIONS

U.S. Appl. No. 12/889,121, "Providing Per Core Voltage and Frequency Control," filed Sep. 23, 2010, by Pakaj Kumar.
(Continued)

*Primary Examiner* — Cheng-Yuan Tseng
(74) *Attorney, Agent, or Firm* — Trop, Pruner & Hu, P.C.

(57) ABSTRACT

In one embodiment, the present invention is directed to a processor having a plurality of cores and a cache memory coupled to the cores and including a plurality of partitions. The processor can further include a logic to dynamically vary a size of the cache memory based on a memory boundedness of a workload executed on at least one of the cores. Other embodiments are described and claimed.

13 Claims, 4 Drawing Sheets

Related U.S. Application Data continuation of application No. 13/285,465, filed on Oct. 31, 2011, now Pat. No. 9,158,693.

(51) Int. Cl.
  *G06F 12/084* (2016.01)
  *G06F 12/0864* (2016.01)
  *G06F 1/28* (2006.01)
  *G06F 12/0802* (2016.01)
  *G06F 12/0846* (2016.01)

(52) U.S. Cl.
  CPC ........ *G06F 12/0802* (2013.01); *G06F 12/084* (2013.01); *G06F 12/0848* (2013.01); *G06F 12/0864* (2013.01); *G06F 2212/1028* (2013.01); *G06F 2212/282* (2013.01); *G06F 2212/502* (2013.01); *G06F 2212/621* (2013.01); *Y02D 10/13* (2018.01)

(56) References Cited

U.S. PATENT DOCUMENTS

| | | | |
|---|---|---|---|
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,908,227 B2 | 6/2005 | Fusu et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,127,560 B2 * | 10/2006 | Cohen .............. G06F 1/3225 707/999.201 | |
| 7,146,514 B2 | 12/2006 | Kaushik et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,574,321 B2 | 8/2009 | Kernahan et al. | |
| 7,596,464 B2 | 9/2009 | Hermerding et al. | |
| 7,603,577 B2 | 10/2009 | Yamaji et al. | |
| 7,606,976 B2 * | 10/2009 | Raghuvanshi ...... G06F 12/0802 711/118 | |
| 7,624,215 B2 | 11/2009 | Axford et al. | |
| 7,730,340 B2 | 6/2010 | Hu et al. | |
| 7,752,467 B2 | 7/2010 | Tokue | |
| 7,797,512 B1 | 9/2010 | Cheng et al. | |
| 7,966,511 B2 | 6/2011 | Naveh et al. | |
| 8,015,427 B2 | 9/2011 | Miller et al. | |
| 8,412,971 B2 * | 4/2013 | Branover .............. G06F 1/3203 711/118 | |
| 8,601,288 B2 | 12/2013 | Brinks et al. | |
| 9,021,207 B2 | 4/2015 | Kalamatianos | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0030940 A1 | 2/2004 | Espinoza-Ibarra et al. | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0046400 A1 | 3/2005 | Rotem | |
| 2005/0132238 A1 | 6/2005 | Nanja | |
| 2005/0223258 A1 | 10/2005 | Watts | |
| 2005/0288888 A1 | 12/2005 | Therien et al. | |
| 2006/0006166 A1 | 1/2006 | Chen et al. | |
| 2006/0041766 A1 | 2/2006 | Adachi | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight et al. | |
| 2007/0101174 A1 | 5/2007 | Tsukimori et al. | |
| 2007/0106428 A1 | 5/2007 | Omizo et al. | |
| 2007/0106827 A1 | 5/2007 | Boatright et al. | |
| 2007/0156992 A1 | 7/2007 | Jahagirdar | |
| 2007/0168151 A1 | 7/2007 | Kernahan et al. | |
| 2007/0214342 A1 | 9/2007 | Newburn | |
| 2007/0234083 A1 | 10/2007 | Lee | |
| 2007/0239398 A1 | 10/2007 | Song et al. | |
| 2007/0245163 A1 | 10/2007 | Lu et al. | |
| 2007/0260895 A1 | 11/2007 | Aguilar et al. | |
| 2008/0005603 A1 | 1/2008 | Deep et al. | |
| 2008/0028240 A1 | 1/2008 | Arai et al. | |
| 2008/0028778 A1 | 2/2008 | Millet | |
| 2008/0077282 A1 | 3/2008 | Hartman et al. | |
| 2008/0077813 A1 | 3/2008 | Keller et al. | |
| 2008/0136397 A1 | 6/2008 | Gunther et al. | |
| 2008/0250260 A1 | 10/2008 | Tomita | |
| 2008/0307240 A1 | 12/2008 | Dahan et al. | |
| 2009/0006871 A1 | 1/2009 | Liu et al. | |
| 2009/0070605 A1 | 3/2009 | Nijhawan et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2009/0235108 A1 | 9/2009 | Gold et al. | |
| 2009/0271141 A1 | 10/2009 | Coskun et al. | |
| 2009/0271646 A1 | 10/2009 | Talwar et al. | |
| 2009/0313489 A1 | 12/2009 | Gunther et al. | |
| 2010/0058078 A1 | 3/2010 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2010/0250856 A1 | 9/2010 | Owen et al. | |
| 2010/0332927 A1 | 12/2010 | Kurts et al. | |
| 2011/0022865 A1 | 1/2011 | Gunther et al. | |
| 2011/0072429 A1 | 3/2011 | Celeskey et al. | |
| 2011/0093733 A1 | 4/2011 | Kruglick | |
| 2011/0154090 A1 | 6/2011 | Dixon et al. | |
| 2011/0161627 A1 | 6/2011 | Song et al. | |
| 2011/0283124 A1 | 11/2011 | Branover et al. | |
| 2012/0053897 A1 | 3/2012 | Naffziger | |
| 2012/0066535 A1 | 3/2012 | Naffziger | |
| 2012/0096288 A1 | 4/2012 | Bates et al. | |
| 2012/0110352 A1 | 5/2012 | Branover et al. | |
| 2012/0114010 A1 | 5/2012 | Branch | |
| 2012/0116599 A1 | 5/2012 | Arndt et al. | |
| 2012/0173907 A1 | 7/2012 | Moses et al. | |
| 2013/0246825 A1 | 9/2013 | Shannon | |
| 2013/0256825 A1* | 10/2013 | Humbert ................. H01L 27/16 257/467 | |
| 2014/0108734 A1 | 4/2014 | Kitchin | |

FOREIGN PATENT DOCUMENTS

| | | |
|---|---|---|
| CN | 101010655 | 5/2010 |
| EP | 1 282 030 A1 | 5/2003 |
| KR | 10-2006-012846 | 12/2006 |
| TW | 201040701 | 11/2010 |
| TW | I342498 | 5/2011 |

(56) References Cited

FOREIGN PATENT DOCUMENTS

TW 201120628 6/2011
TW I344793 7/2011

OTHER PUBLICATIONS

SPEC-Power and Performance, Design Overview V1.10, Standard Performance Information Corp., Oct. 21, 2008, 6 pages.
U.S. Appl. No. 13/070,700, "Obtaining Power Profile Information With Low Overhead," filed Mar. 24, 2011, by Robert Knight.
Anoop Iyer, et al., "Power and Performance Evaluation of Globally Asynchronous Locally Synchronous Processors," 2002, pp. 1-11.
Greg Semeraro, et al., "Hiding Synchronization Delays in a GALS Processor Microarchitecture," 2004, pp. 1-13.
Joan-Manuel Parcerisa, et al., "Efficient Interconnects for Clustered Microarchitectures," 2002, pp. 1-10.
David L. Hill, et al., "The Uncore: A Modular Approach to Feeding the High-Performance Cores," Intel Technology Journal, 2010, vol. 14, Issue 3, pp. 30-49.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
Intel Technology Journal, "Power and Thermal Management in the Intel Core Duo Processor," May 15, 2006, pp. 109-122.
U.S. Patent and Trademark Office, Office Action dated Jul. 31, 2014, in U.S. Appl. No. 13/247,564.
U.S. Patent and Trademark Office, Office Action dated Jan. 16, 2014, with Reply filed Apr. 9, 2014, in U.S. Appl. No. 13/247,564.
U.S. Patent and Trademark Office, Office Action dated Jun. 6, 2014, with Reply filed Sep. 4, 2014, in U.S. Appl. No. 13/282,947.
U.S. Patent and Trademark Office, Office Action dated May 16, 2014, with Reply filed Aug. 12, 2014, in U.S. Appl. No. 13/285,414.
U.S. Patent and Trademark Office, Final Office Action dated May 14, 2014, with Request for Continued Examination filed Aug. 13, 2014, in U.S. Appl. No. 13/247,580.
U.S. Appl. No. 13/282,947, filed Oct. 27, 2011, entitled "Controlling Operating Frequency of a Core Domain Via a Non-Core Domain of a Multi-Domain Processor," by Avinash N. Ananthakrishnan, et al.
U.S. Appl. No. 13/285,414, filed Oct. 31, 2011, entitled "Controlling a Turbo Mode Frequency of a Processor," by Avinash N. Ananthakrishnan, et al.
U.S. Appl. No. 13/225,677, filed Sep. 6, 2011, entitled "Dynamically Allocating a Power Budget Over Multiple Domains of a Processor," by Avinash N. Ananthakrishnan, et al.
U.S. Appl. No. 13/247,580, filed Sep. 28, 2011, entitled "Controlling Temperature of Multiple Domains of a Multi-Domain Processor," by Avinash N. Ananthakrishnan, et al.
U.S. Appl. No. 13/282,896, filed Oct. 27, 2011, entitled "Enabling a Non-Core Domain to Control Memory Bandwidth," by Avinash N. Ananthakrishnan, et al.
Intel Developer Forum, IDF2010, Opher Kahn, et al, "Intel Next Generation Microarchitecture Codename Sandy Bridge: New Processor Innovations," Sep. 13, 2010, 58 pages.

* cited by examiner

DYNAMICALLY CONTROLLING CACHE SIZE TO MAXIMIZE ENERGY EFFICIENCY

This application is a continuation of U.S. patent application Ser. No. 14/840,639, filed Aug. 31, 2015, which is a continuation of U.S. patent application Ser. No. 13/285,465, filed Oct. 31, 2011, now U.S. Pat. No. 9,158,693, issued Oct. 13, 2015, the content of which is hereby incorporated by reference.

BACKGROUND

Modern processors support different low power states including package low power states in which various subcomponents of the processor are either powered down or clock gated. Typically in a package low power state, cache memories of the processor are flushed and powered down. Flushing the cache memory removes context that a core might try to access on a subsequent wake up. If on wake up the core seeks to access content that was flushed from the cache, the core pays a penalty of staying active and powered on waiting for the data to be fetched from system memory. This extra energy spent by the core in a powered on state may outweigh the benefit of the energy saved keeping the flushed ways powered down.

DETAILED DESCRIPTION

Embodiments provide a technique to determine an optimal portion of a cache memory, e.g., a number of ways of a last level cache memory (LLC), to maintain powered (kept open) while a processor including the cache memory is placed in a package low power state. In some embodiments, this determination can be based on how useful the last level cache is to core activity. As such, a cache memory can have a dynamically variable size depending on its usefulness to core operation.

In this way, a controllable amount of a cache memory of a multicore processor can be placed into a low power state during periods in which power consumption of the processor is to be reduced. More particularly, when the processor is placed into a package low power state such that all cores of the processor are in a low power state, at least some of the associated cache memory of the processor can also be placed into a low power state and thus the size of the cache is dynamically changed. However, even in this package low power state it is possible to maintain at least a portion of the cache in a powered on state such that context associated with one or more cores of the processor can be maintained and stored in the cache memory. In this way, upon wakeup from the package low power state, this state is available to the core without incurring the performance and power penalty of obtaining the state from a system memory coupled to the processor.

In many embodiments, power management of a processor for optimizing system power can be performed in relation to an Advanced Configuration and Power Interface (ACPI) standard, e.g., Rev. 3.0b, published Oct. 10, 2006. An ACPI implementation allows a processor core to be in different power consumption states, generally referred to as so-called C1 to Cn states. When a core is active, it runs at a so-called C0 state, and when the core is idle it may be placed in a core low power state, a so-called core non-zero C-state (e.g., C1-C6 states). When all cores of a multicore processor are in a core low power state, the processor can be placed in a package low power state, such as a package C6 low power state. In addition, embodiments provide for a deeper package low power state, referred to herein as a package C7 state, in which greater power savings can be achieved. In this state, all cores can be power gated, additional functional units such as a graphics domain can be power gated, and system agent circuitry including a power controller and other logic can be run at a lower frequency of operation. Furthermore, in accordance with an embodiment of the present invention, a shared cache memory such as an LLC can be power gated, or one or more portions of the shared cache memory can be maintained with a retention voltage, which may be a lower voltage than an operating voltage, to keep a context or state of one or more cores so that a reduced latency on wakeup can be realized.

Although some embodiments are applicable to a multicore processor, understand the scope of the present invention is not limited in this regard and other embodiments may be for use in a multi-domain processor. As used herein the term "domain" is used to mean a collection of hardware and/or logic that operates at the same voltage and frequency point. As an example, a multi-domain processor including multiple cores can further include other non-core processing engines such as fixed function units, graphics engines, and so forth. Such processor can include at least two independent domains, one associated with the cores (referred to as a core domain) and one associated with a graphics engine (referred to as a graphics domain). Although many implementations of a multi-domain processor can be formed on a single semiconductor die, other implementations can be realized by a multi-chip package in which different domains can be present on different semiconductor die of a single package.

As will be described herein, in various embodiments a determination can occur as to an amount of cache memory to place into a low power state. Prior to such low power state entry, the data of the cache portion being placed in the low power state is flushed to system memory. Instead a portion of the cache memory to remain powered is not flushed, such that the computing and power expense of performing the flush can be avoided. This determination can be based, in many implementations on a memory boundedness of a workload that is executing on the processor. Different measures of memory boundedness can be made. In one embodiment a measure of memory boundedness can be based on information regarding a measure of pendency of instructions in an order buffer as compared to a duration of time the processor spends in an active state. Of course other measures of determining boundedness can be used, such as number of misses sent to a last level cache from a core during a time interval.

For example, for an evaluation interval, a ratio can be determined between the number of cycles that a load operation is pending in a memory order buffer compared to the number of cycles that the core is in an active state during this evaluation interval. To effect such analysis, each entry of the memory order buffer can include, in addition to a field for instruction type (e.g., load or store), address and other fields, a counter field that accumulates for each cycle that the instruction is pending in the entry. To smooth out the data of this ratio, an average of the pending duration in the memory order buffer for all pending load operations during an evaluation interval can be compared to a count of the number of cycles during the evaluation interval that the processor was in an active state. Accordingly, the memory boundedness can be determined according to Equation 1:

total cycles outstanding load pendency in order buffer/total cycles in active state [EQ. 1].

This Equation 1 thus generates a ratio of average order buffer residency to active state residency. Thus in this example, the calculation results in a ratio of the cycles a core was waiting for a load pending in an order buffer and the number of clocks that the core was in an active state. This gives a percentage of how memory bound a core (or a workload running on the core) is. If the number of cycles a load is pending is equal to the number of cycles in the active state, the workload is said to be 100% memory bound. Note that a similar analysis can be performed for a non-core domain, e.g., a graphics engine based on load pendency in a buffer between one or more graphics execution units and a memory controller.

Embodiments can leverage this information regarding memory boundedness to determine an appropriate portion of a cache memory to maintain in a powered state during a package low power state. In this package low power state, all cores of the processor can be placed into a low power mode and data stored in one or more portions of the cache memory can be flushed to system memory and these portions are placed in a low power state. In some embodiments, this low power state may be a power gated state in which no power is provided and thus no leakage current is consumed. However, one or more other portions, as determined above, can be maintained with a retention voltage to thus maintain their state.

Although embodiments can be applied to different cache memory systems, many implementations can be used for the LLC, which is the uppermost hierarchy of coherent static random access memory (SRAM) cache available on a processor die. This cache memory can be organized into sets and ways, e.g., a 4 megabytes (MBs) cache that is 16 way set associative has 16 ways×256 sets. For sake of discussion, ways are the smallest level of granularity at which a portion of the cache can be flushed or powered down.

The amount of memory bandwidth used by an executing core is a function of the workload that is running on the core. In some embodiments, a processor can include, e.g., in each entry of a buffer such as a memory order buffer (MOB), a counter to track the number of clock cycles that a load is pending in the MOB. The higher the number of cycles a load is pending in the MOB, the less useful work the core can be doing. In other words the core is said to be memory bound. If the core is memory bound one course of alleviating the memory boundedness is to allow the core to use more of the LLC. The more LLC accessed by the core, the longer the latency to flush all the cache contents when powering down the cache. The less memory bound a core is (or) the more LLC ways open, the lower its active state residency and hence the lower energy spent while the core is active. The greater number of LLC ways that are opened, the longer the latency to flush the cache and hence a greater energy cost is incurred in entering into a deep package low power state. As a result, embodiments can maximize the overall energy efficiency by balancing and trading off energy spent in flushing the cache to enter into a deep package low power state with energy saved running the cores for a shorter duration when they are active. To perform this balance, embodiments may predict how memory bound a workload is.

Figure 1:
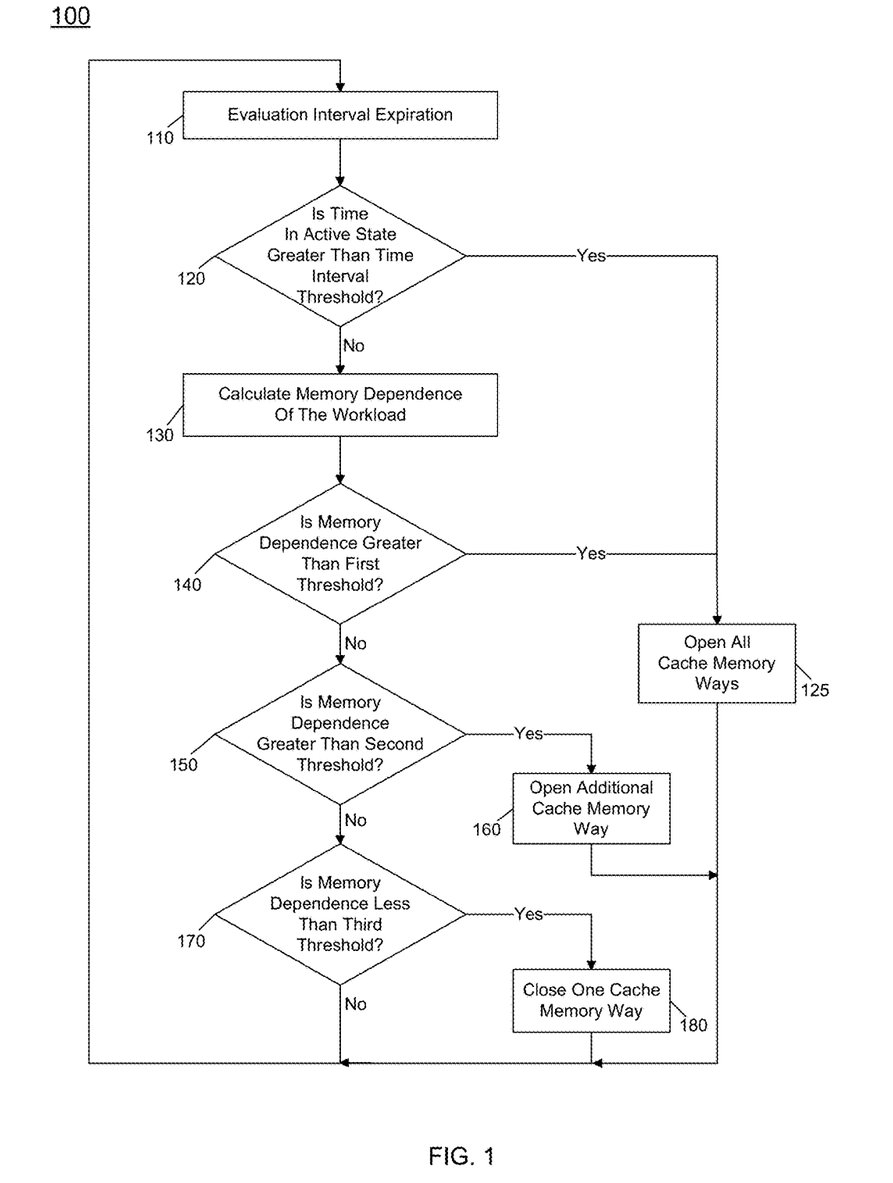
FIG. 1 is a flow diagram of a method in accordance with an embodiment of the present invention.

Referring now to FIG. 1, shown is a flow diagram of a method in accordance with an embodiment of the present invention. As shown in FIG. 1, method 100 can be performed using logic of a power control unit (PCU) or other power controller of a processor. As seen in FIG. 1, method 100 may begin by allowing an evaluation interval to expire (block 110). Although the scope of the present invention is not limited in this regard, in one embodiment this evaluation interval may be between approximately 1 and 50 milliseconds (ms). During this time, information can be maintained that will be used by the PCU logic for a memory boundedness determination. As one example, this information can include counters for each entry in the memory order buffer, as well as a state counter that counts a duration of time the processor spends in an active (e.g., C0) power state.

Thus as seen, at the conclusion of this evaluation interval, it can be determined whether the amount of time during the evaluation interval the processor spent in an active power state (e.g., of a C2 or higher power state) is greater than a threshold time interval (diamond 120) which in one embodiment can be on the order of 2 ms. If so, this means the processor is actively handling a high workload and accordingly, control passes to block 125 where the entire cache memory can be powered on. More specifically, at block 125 PCU logic can control the cache memory such that all ways of the cache memory are enabled, allowing the full cache size to be used (assuming it was not previously fully powered). Note that the C2 state may correspond to a low latency lower power state in which instructions are not retired while a core is waiting for a return of data, e.g., from a memory hierarchy.

If instead during the evaluation interval the package was not in an active power state for greater than this threshold time interval, control passes to block 130 where a memory dependence of the workload of the processor can be calculated. As discussed above this determination can be made in one embodiment by calculating a ratio of memory boundedness using an average length of residency in the memory order buffer and the length of time the processor was in an active state for the operation interval. Based on this calculation, at diamond 140 it can be determined whether the memory dependency value is greater than a first threshold. This first threshold may be a level that above which the full cache memory is to be enabled. In some embodiments, this threshold can be set at between approximately 50% to 70%, where the memory dependency value is the ratio described above. Thus if the ratio is higher than this threshold, control again passes to block 125 as discussed above. If instead the memory dependency value is lower than this first threshold, control passes to diamond 150 where it can be determined whether the memory dependency value is greater than a second threshold. In some embodiments, this threshold can be set at between approximately 30% to 50%. This second threshold may be a value at which an additional portion of the cache memory is to be enabled. Thus as shown at block 160, another way of the cache memory can be enabled. As a result, a greater portion of the cache memory is available for use and thus the memory boundedness of the workload should improve. In some embodiments, the determination of which way to be enabled can be based on how many ways are allocated to cores of a core domain versus ways allocated to a graphics domain and how memory bound each of the domains are.

Still referring to FIG. 1, if instead the memory dependency value is not greater than this second threshold, control passes to diamond 170, where it can be determined whether the value is less than a third threshold. As an example, in some embodiments, this threshold can be set at between approximately 10% to 20%. This third threshold is a value that below which, a portion of the cache memory can be disabled to thus reduce power consumption. Accordingly, because at this level the workload is not memory bounded, control passes to block 180 where a portion of the cache memory can be disabled. More specifically, a given way of the cache memory can be disabled to thus dynamically reduce a size of the cache memory for achieving greater power consumption while balancing the sufficiency of cache memory usage for a given workload. In some embodiments, the determination of which way to be disabled can be based on the ways that are assigned to cores of the core domain or to the graphics domain and which of these domains is not memory bound. Although shown with this particular implementation in the embodiment of FIG. 1, understand the scope of the present invention is not limited in this regard.

Referring now to Table 1, shown is pseudocode of a LLC shrink/expand algorithm in accordance with an embodiment of the present invention. As seen, the algorithm defines the following parameters: evaluation_interval, which is the interval over which a determination of memory boundedness is performed; open_one_way_threshold specifies a threshold level of how memory bounded a workload is to be during an evaluation interval to open one additional way in the LLC; open_all_way_threshold, which specifies a threshold level of how memory bounded a workload is to be during the evaluation interval to immediately open all LLC ways; and close_one_way threshold, which specifies the memory bounded threshold the workload is to exceed to close one LLC way. These parameters can be tuned on a given platform to yield best energy efficiency and performance tradeoff

TABLE 1

Every evaluation interval
Calculate time in PackageC2
If time in PackageC2 > open_all_threshold {
    => open all LLC ways and skip to end
} else {
    Calculate memory boundedness over last evaluation interval
    Memory_bounded_percentage = (Number of cycles a load is pending in the MOB)/(Number of cycles core was in C0)
    If (memory_bounded > 'open_all_threshold') {
        Open all LLC ways
    } else if (memory_ bounded > 'open_one_threshold') {
        Open one additional LLC way
    } else if (memory_bounded < 'close_one_threshold') {
        Close one additional LLC way }
}

Embodiments thus provide a workload memory demand aware mechanism to size the last level cache and to maximize processor energy efficiency. More specifically a mechanism can be provided to tradeoff latency and energy cost to enter deep package low power state with energy consumed while active. Choosing the optimal cache size on workloads that enter into and exit from deep package low processor states may provide better energy efficiency and longer battery life.

Figure 2:
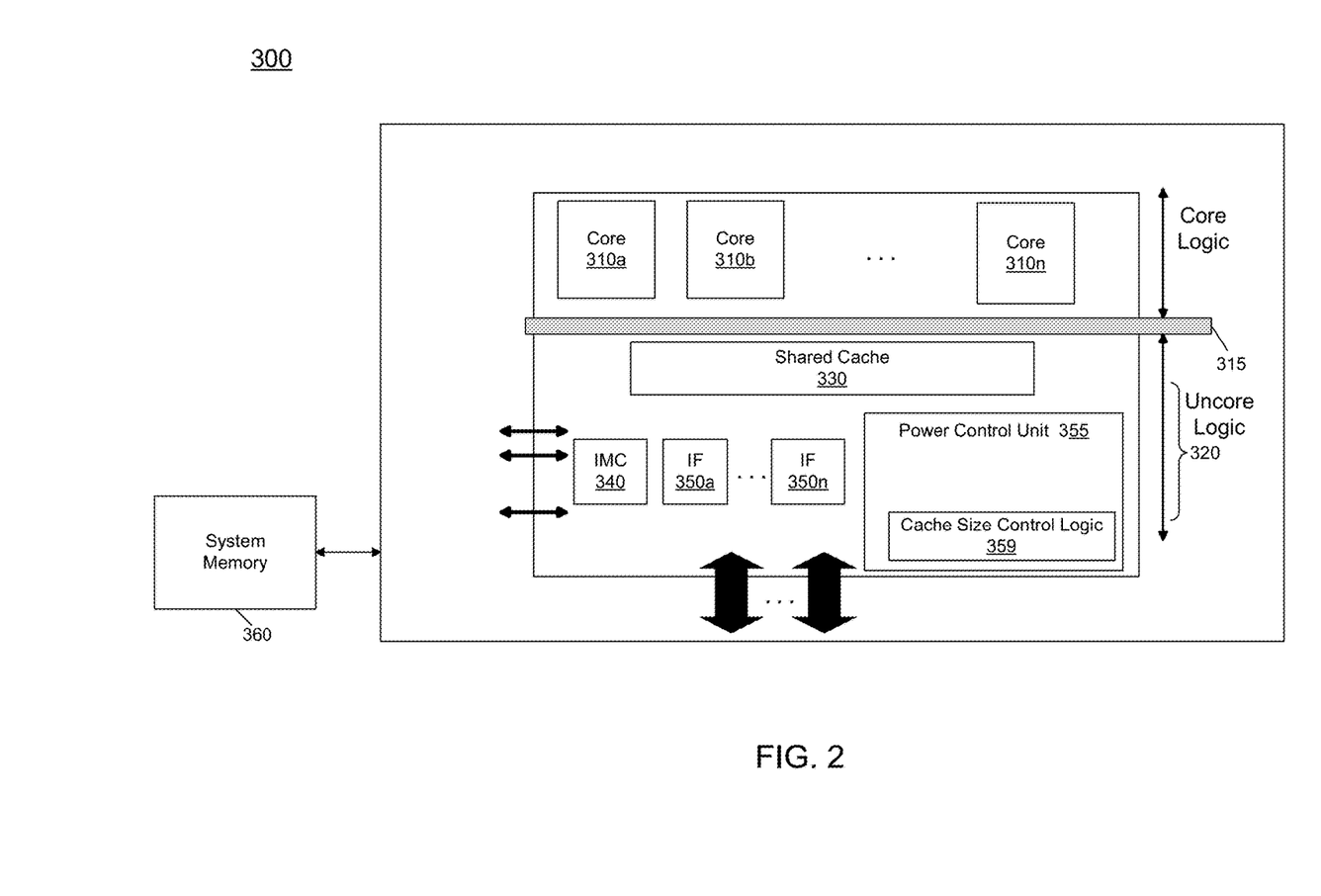
FIG. 2 is a block diagram of a processor in accordance with an embodiment of the present invention.

Referring now to FIG. 2, shown is a block diagram of a processor in accordance with an embodiment of the present invention. As shown in FIG. 2, processor 300 may be a multicore processor including a plurality of cores $310_a$-$310_n$. In one embodiment, each such core may be of an independent power domain and can be configured to operate at an independent voltage and/or frequency, and to enter turbo mode when available headroom exists. The various cores may be coupled via an interconnect 315 to a system agent or uncore 320 that includes various components. As seen, the uncore 320 may include a shared cache 330 which may be a last level cache, a size of which can be dynamically controlled in accordance with an embodiment of the present invention. In addition, the uncore may include an integrated memory controller 340, various interfaces 350 and a power control unit 355.

In various embodiments, power control unit 355 may include a cache size control logic 359, which may be a logic to perform dynamic control of a size of shared cache 330 to remain in a powered on state during a package low power state. Accordingly, based on a workload executing on the cores, logic 359 can determine an appropriate amount of shared cache 340 to remain in a powered on state, both during normal operation and during a package low power state. For example, the LLC hit rate or amount of bandwidth being consumed from the LLC when a core is active can be used to determine the cache size. The duration of time that the package is in a package low power state (e.g., a package C6 state) in turn can be used to determine whether it is appropriate to reduce the cache size and transition into a lower package low power state (e.g., a package C7 state).

With further reference to FIG. 2, processor 300 may communicate with a system memory 360, e.g., via a memory bus. In addition, by interfaces 350, connection can be made to various off-chip components such as peripheral devices, mass storage and so forth. While shown with this particular implementation in the embodiment of FIG. 2, the scope of the present invention is not limited in this regard.

Figure 3:
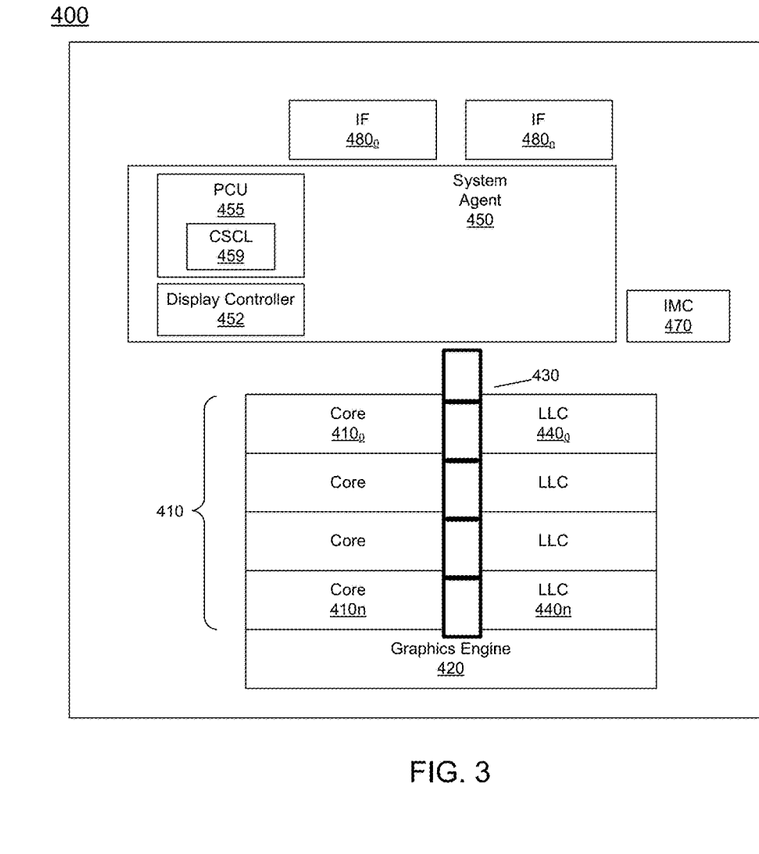
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 400 includes multiple domains. Specifically, a core domain 410 can include a plurality of cores $410_0$-$410_n$, a graphics domain 420 can include one or more graphics engines, and a system agent domain 450 may further be present. In various embodiments, system agent domain 450 may execute at a fixed frequency and may remain powered on at all times to handle power control events and power management such that domains 410 and 420 can be controlled to dynamically enter into and exit low power states. Each of domains 410 and 420 may operate at different voltage and/or power. Note that while only shown with three domains, understand the scope of the present invention is not limited in this regard and additional domains can be present in other embodiments. For example, multiple core domains may be present each including at least one core.

In general, each core 410 may further include low level caches in addition to various execution units and additional processing elements. In turn, the various cores may be coupled to each other and to a shared cache memory formed of a plurality of units of a LLC $440_0$-$440_n$. In various embodiments, LLC 440 may be shared amongst the cores and the graphics engine, as well as various media processing circuitry. As seen, a ring interconnect 430 thus couples the cores together, and provides interconnection between the cores, graphics domain 420 and system agent circuitry 450.

In one embodiment, interconnect 430 can be part of the core domain. However in other embodiments the ring interconnect can be of its own domain.

In the embodiment of FIG. 3, when domains 410 and 420 are in a low power state, system agent domain 450 may cause the processor to enter into a deeper low power state in which the domains may be power gated, and only a determined amount of LLC 440 can remain power on with a retention voltage. As further seen, system agent domain 450 may include display controller 452 which may provide control of and an interface to an associated display. As further seen, system agent domain 450 may include a power control unit 455 which can include a cache size control logic 459 in accordance with an embodiment of the present invention to dynamically control an active size of LLC 440. In various embodiments, this logic may execute the algorithm described above in FIG. 1.

As further seen in FIG. 3, processor 400 can further include an integrated memory controller (IMC) 470 that can provide for an interface to a system memory, such as a dynamic random access memory (DRAM). Multiple interfaces $480_0$-$480_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 3, understand the scope of the present invention is not limited in this regard.

Figure 4:
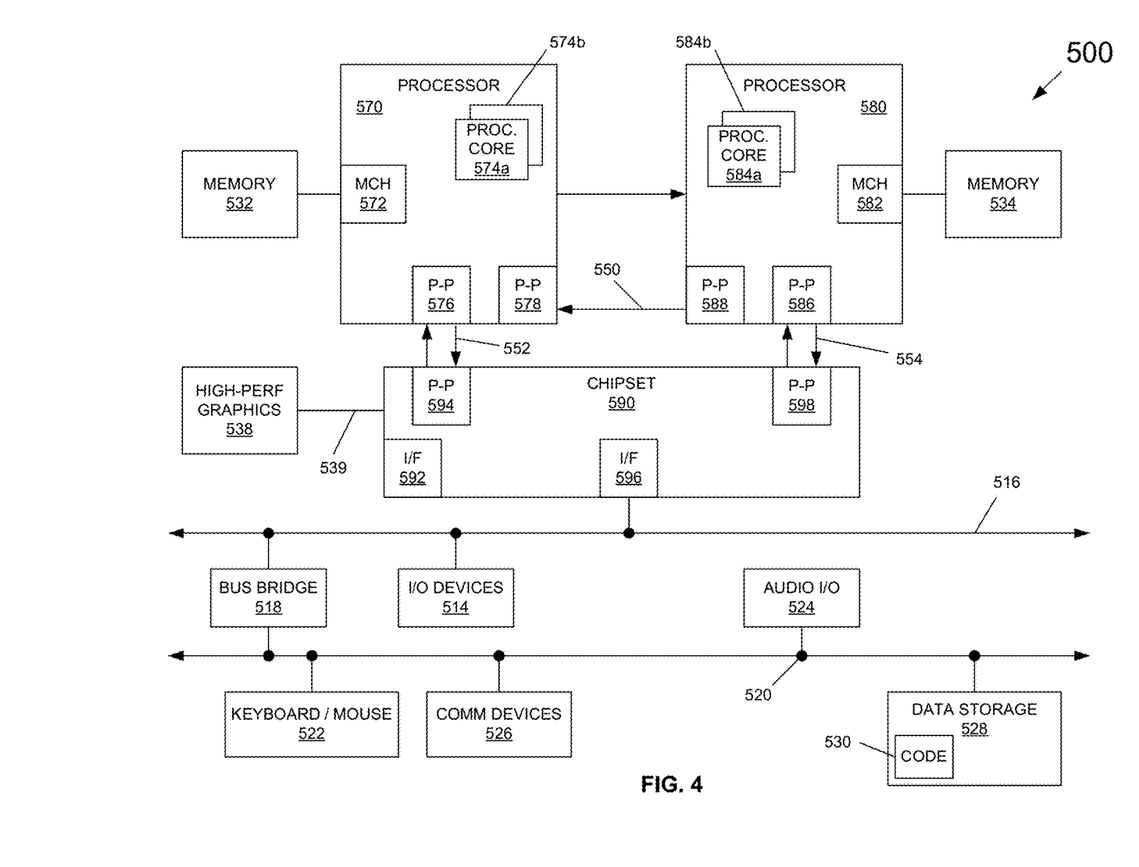
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b), although potentially many more cores may be present in the processors. Each of the processors can include a PCU or other logic to perform dynamic control of the active size of an on-chip shared cache memory, as described herein.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 4, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Embodiments can be incorporated into other types of systems including mobile devices such as a smart cellular telephone, tablet computer, netbook, ultrabook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a first core;
   a second core;
   a first cache memory coupled to the first core and the second core and to operate with a plurality of ways, the first cache memory comprising an N way set associative cache memory, wherein the first cache memory comprises a shared cache memory;
   first hardware logic to cause one or more of the first core and the second core to transition from a first power state to a second power state, wherein the second power state comprises a package low power state in which the first core and the second core are power gated and at least one way of the first cache memory is to be powered with a retention voltage to maintain a context of at least one of the first core and the second core; and
   second hardware logic to dynamically vary a size of the first cache memory based at least in part on a performance metric of a workload to be executed on at least one of the first core and the second core, wherein the second hardware logic is to cause a single first additional way of the N ways of the first cache memory to be enabled to increase a size of the first cache memory based on a comparison of a first value of the performance metric to a threshold.

2. The processor of claim 1, further comprising a second cache memory.

3. The processor of claim 2, wherein the second cache memory is included within the first core.

4. The processor of claim 1, further comprising a controller, the controller comprising at least one of the first hardware logic and the second hardware logic.

5. The processor of claim 1, further comprising at least one Peripheral Component Interconnect Express (PCIe) interface.

6. The processor of claim 1, wherein the second hardware logic is to cause a second additional way of the first cache memory to be enabled to increase the size of the first cache memory based on a comparison of a second value of the performance metric to the threshold.

7. The processor of claim 1, further comprising a third cache memory associated with the second core, wherein the second cache memory is associated with the first core.

8. A computing system comprising:
a processor;
memory coupled to the processor; and
storage coupled to the processor, wherein the processor comprises:
a first core;
a second core;
a first cache memory coupled to the first core and the second core and to operate with a plurality of ways, the first cache memory comprising an N way set associative cache memory;
first hardware logic to cause one or more of the first core and the second core to transition from a first power state to a second power state, wherein the second power state comprises a package low power state in which the first core and the second core are power gated and at least one way of the first cache memory is to be powered with a retention voltage to maintain a context of at least one of the first core and the second core; and
second hardware logic to dynamically vary a size of the first cache memory based at least in part on a performance metric of a workload to be executed on at least one of the first core and the second core, wherein the second hardware logic is to cause a single first additional way of the N ways of the first cache memory to be enabled to increase a size of the first cache memory based on a first result of a comparison of a first value of the performance metric to a threshold and cause a single second way of the N ways of the first cache memory to be disabled to decrease the size of the first cache memory based on a second result of the comparison of the first value of the performance metric to the threshold.

9. The computing system of claim 8, further comprising at least one communication device coupled to the processor.

10. The computing system of claim 8, wherein the computing system comprises a server.

11. At least one non-transitory computer readable storage medium comprising instructions that when executed enable a system to:
transition at least one of a first core and a second core of a multicore processor from a first power state to a second power state;
compare a first value of a performance metric of a workload executing on at least one of the first core and the second core to a threshold; and
dynamically vary a size of a first cache memory coupled to the first core and the second core based at least in part on a first result of a comparison of the first value to the threshold, including enabling a first additional way of the first cache memory to increase a size of the first cache memory, the first cache memory comprising an N way set associative cache memory and the second power state comprising a package low power state in which the first core and the second core are power gated and at least one way of the first cache memory is to be powered with a retention voltage to maintain a context state of at least one of the first core and the second core.

12. The at least one non-transitory computer readable medium of claim 11, further comprising instructions that when executed enable the system to:
compare a second value of the performance metric of the workload executing on the at least one of the first core and the second core to the threshold; and
enable a second additional way of the first cache memory to increase the size of the first cache memory based at least in part on a second result of the comparison of the second value to the threshold.

13. The at least one non-transitory computer readable medium of claim 11, further comprising instructions that when executed enable the system to enable all of a plurality of ways of the first cache memory based at least in part on another value of the performance metric of the workload.

* * * * *